US008578242B1

(12) United States Patent
Burton et al.

(10) Patent No.: US 8,578,242 B1
(45) Date of Patent: Nov. 5, 2013

(54) DATA STORAGE DEVICE EMPLOYING SEED ARRAY FOR DATA PATH PROTECTION

(75) Inventors: Scott E. Burton, Westminster, CO (US); Michael C. Kutas, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 950 days.

(21) Appl. No.: 12/696,950

(22) Filed: Jan. 29, 2010

(51) Int. Cl.
*G11C 29/00* (2006.01)

(52) U.S. Cl.
USPC .......................................................... 714/763

(58) Field of Classification Search
USPC .......................................................... 714/763
See application file for complete search history.

(56) References Cited

U.S. PATENT DOCUMENTS

| 5,610,808 | A | 3/1997 | Squires et al. |
| 7,315,976 | B2 | 1/2008 | Holt |
| 7,539,924 | B1 | 5/2009 | Vasquez et al. |
| 7,559,009 | B1 | 7/2009 | Ricci |
| 7,774,680 | B2 * | 8/2010 | Earhart et al. ................. 714/763 |
| 2009/0204824 | A1 * | 8/2009 | Lin et al. ....................... 713/193 |

* cited by examiner

*Primary Examiner* — Albert Decady
*Assistant Examiner* — Enam Ahmed

(57) ABSTRACT

A data storage device is disclosed including a non-volatile memory comprising a plurality of memory segments. The LBAs of a read command are mapped to PBAs addressing the memory segments. At least two seed values corresponding to two of the LBAs are generated and stored in an array. The array is then indexed to access the seed value corresponding to each LBA, wherein the seed value is used to seed an error code generator.

28 Claims, 6 Drawing Sheets

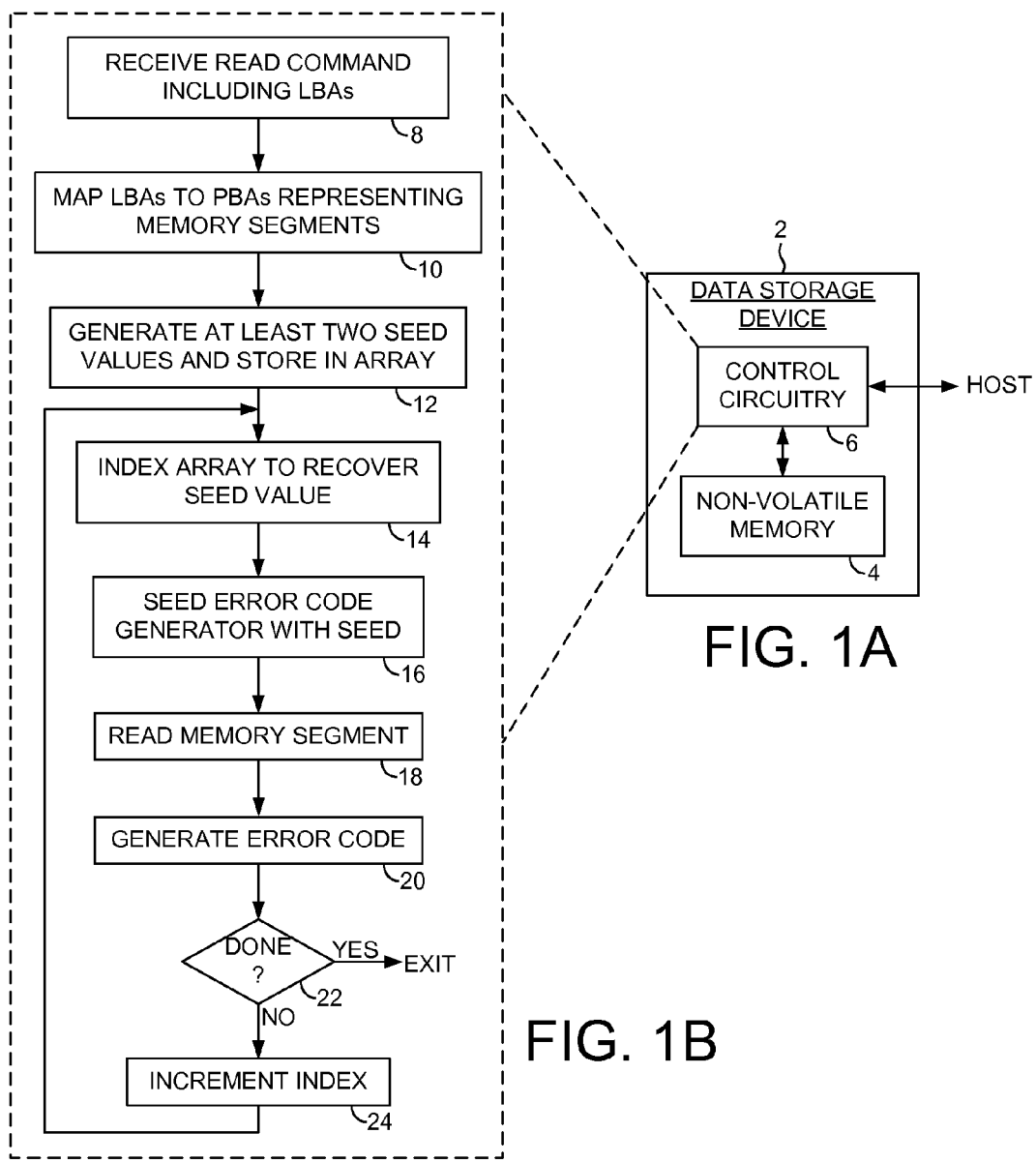

DATA STORAGE DEVICE EMPLOYING SEED ARRAY FOR DATA PATH PROTECTION

BACKGROUND

Data storage devices, such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., flash memory). In order to enable defect mapping (mapping out of defective memory segments of the non-volatile memory), as well as enable wear leveling in solid state drives, the memory segments are typically accessed indirectly by mapping logical block addresses (LBAs) to physical block addresses (PBAs). That is, host access commands (write or read) comprise an LBA that is mapped to a PBA representing a memory segment, where the PBA may change over time due to relocating from a grown defect, or wear leveling to evenly distribute access to the memory segments.

When accessing a memory segment using LBA to PBA mapping, it is important for the storage device to access the correct memory segment. For various reasons, such as malfunctioning firmware, a data storage device may write/read data to/from the wrong PBA, or write the wrong data to the correct PBA, perhaps because of an error in accessing a cache buffer, or in the LBA to PBA mapping algorithm, or in the mapping of PBA to the memory segment. The prior art has employed various forms of "data path protection" wherein the LBA may be used during the write/read operations to ensure the correct memory segment is read and that the memory segment stores the correct data during a read operation. For example, the prior art has suggested to seed an error code generator with the LBA during writing and reading which helps ensure the correct memory segment is being accessed, and that the correct data was written to the memory segment.

BRIEF DESCRIPTION OF THE DRAWINGS

FIG. 1A shows a data storage device according to an embodiment of the present invention including a non-volatile memory comprising a plurality of memory segments.

FIG. 1B is a flow diagram according to an embodiment of the present invention for executing a read operation using seed values stored in an array.

FIG. 1C shows an example array storing seed values for a plurality of LBAs according to an embodiment of the present invention.

DETAILED DESCRIPTION OF EMBODIMENTS OF THE INVENTION

FIG. 1A shows a data storage device 2 according to an embodiment of the present invention including a non-volatile memory 4 comprising a plurality of memory segments. The data storage device 2 further comprises control circuitry 6 for executing the flow diagram of FIG. 1B. A read command is received identifying a plurality of logical block addresses (LBAs) (step 8). The LBAs are mapped to physical block addresses (PBAs) addressing the memory segments (step 10). At least two seed values are generated corresponding to two of the LBAs, and the seed values are stored in an array (step 12). After storing the seed values in the array, the array is indexed to access a first one of the seed values corresponding to a first LBA (step 14). An error code generator is seeded with the first seed value (step 16), and data is read from a first memory segment corresponding to the first LBA (step 18). A first error code is generated using the error code generator (step 20). The index is incremented (step 24) and then used to index the array to access a second one of the seed values corresponding to a second LBA (step 14). The error code generator is seeded with the second seed value (step 16), and data is read from a second memory segment corresponding to the second LBA (step 18). A second error code is generated using the error code generator (step 20). This process continues (step 22) until all of the LBAs of the read command have been processed.

FIG. 1C shows an example read command comprising seven LBAs mapped to seven corresponding PBAs. An array is initialized with a plurality of seed values each corresponding to an LBA, and in one embodiment, the seed value may be the LBA or generated as a function of the LBA. An index is initialized to access the beginning of the array, and then as each LBA is read from the non-volatile memory 4, the index is incremented to access the next seed value. In this manner, the seed values are preloaded into the array and then accessed on-the-fly as each new memory segment is read. This is particularly useful when the LBAs being accessed are non-sequential and the corresponding PBAs are sequential as illustrated in the example of FIG. 1C.

Any suitable error code may be generated using the seed values stored in the array. In one embodiment, the error code is generated according to a cyclic redundancy check (CRC) for use in a data path protection algorithm. The CRC error code is generated as a function of the LBA (seed value) in order to verify that the correct data is written to the correct memory segment. If an error occurs, it will be detected by the CRC error code so as to prevent returning the wrong data to the host during read operations.

Figure 2A:
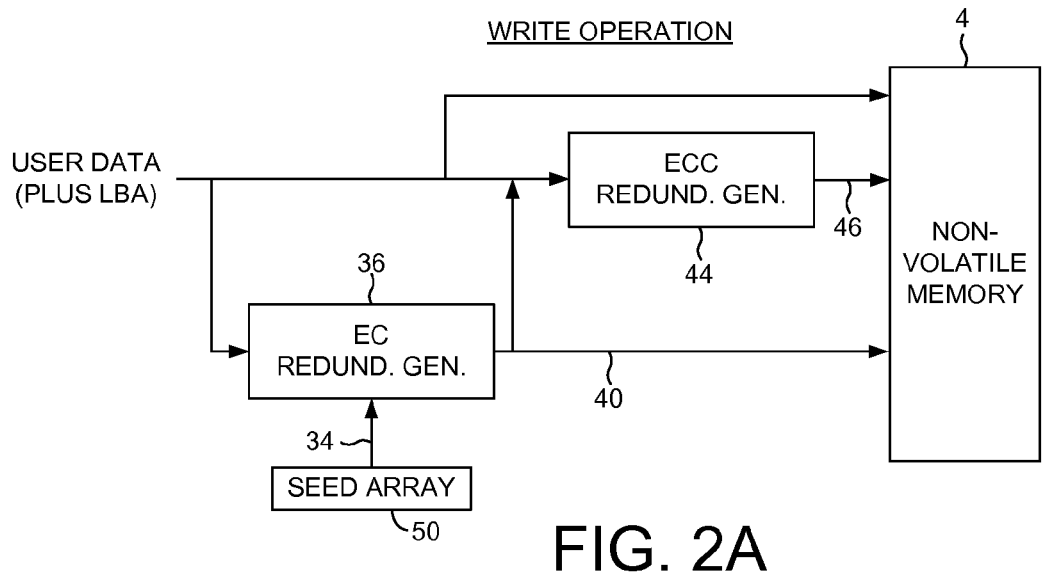
FIG. 2A shows control circuitry according to an embodiment of the present invention for executing a write operation using seed values stored in an array.
Figure 3:
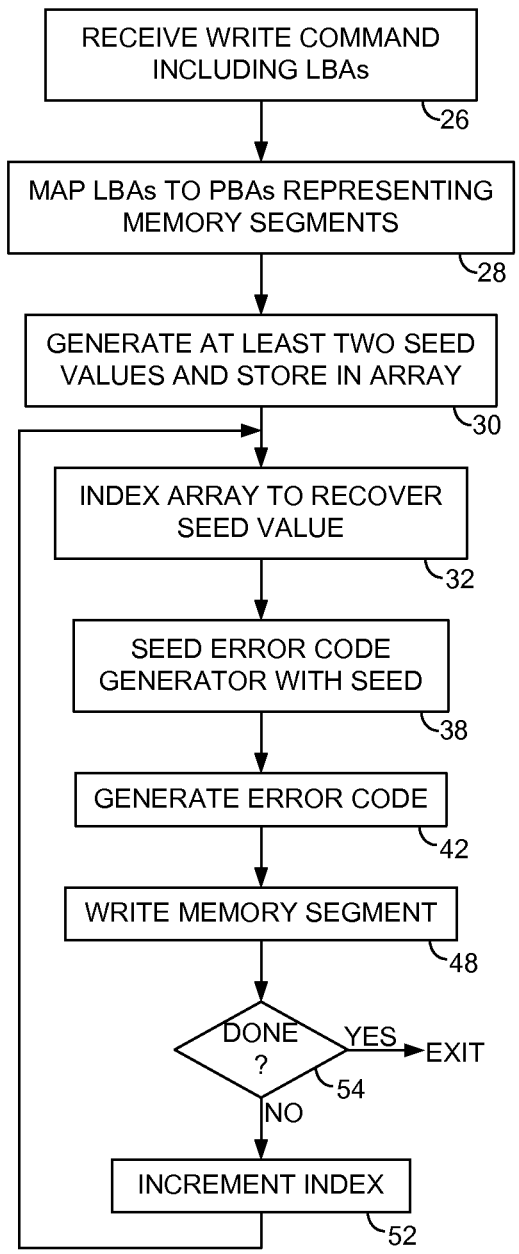
FIG. 3 is a flow diagram according to an embodiment of the present invention for executing a write operation using seed values stored in an array.

FIG. 2A illustrates a write operation according to an embodiment of the present invention which is understood with reference to the flow diagram of FIG. 3. A write command is received from a host comprising user data and a plurality of LBAs (step 26). The LBAs are mapped to PBAs representing memory segments in the non-volatile memory (step 28). At least two seed values are generated corresponding to two of the LBAs and stored in an array 50 (step 30). The array 50 is indexed to recover one of the seed values (step 32), and the seed value 34 is loaded into an error code (EC) redundancy generator 36 (step 38). The EC redundancy generator 36 generates first error code redundancy 40 over the user data (step 42). An error correction code (ECC) redundancy generator 44 generates ECC redundancy 46 over the user data (and optionally over the seed value 34) as well as over the first error code redundancy 40. The user data (and optionally the seed value 34), first error code redundancy 40, and ECC redundancy 46 are written to a memory segment in the non-volatile memory 4 in any suitable order (step 48). An index into the array 50 is incremented (step 52) to recover the next seed value for the next LBA (step 32) and the process is repeated until all of the LBAs in the write command have been processed (step 54).

Figure 2B:
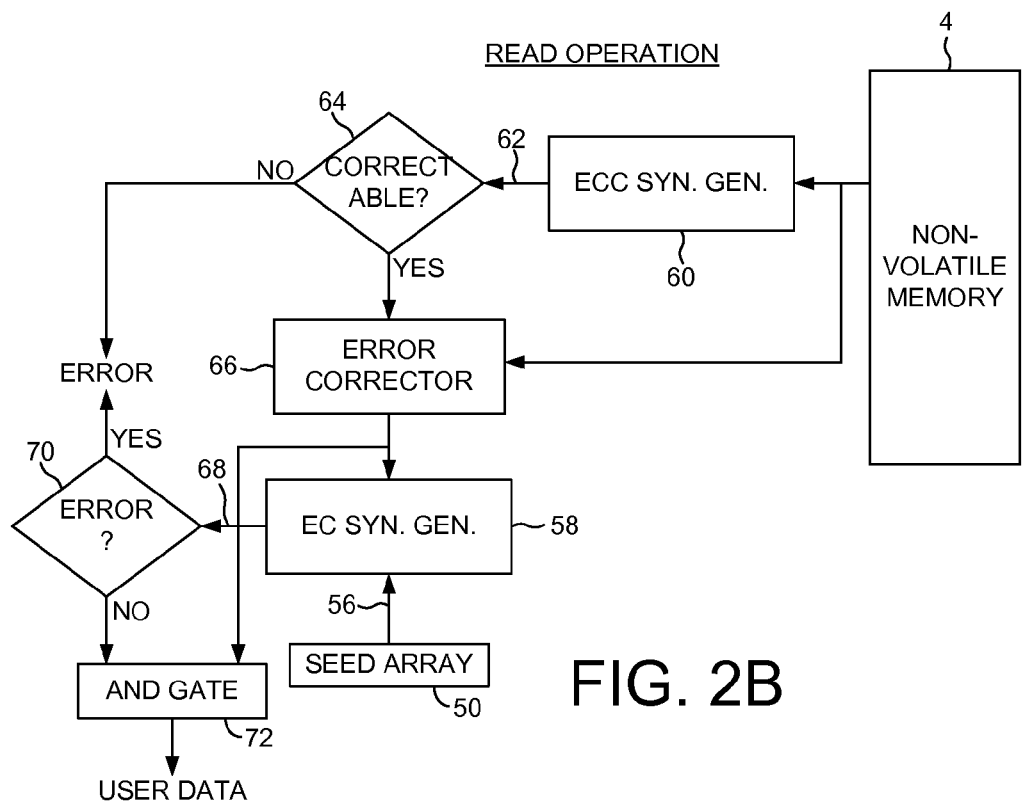
FIG. 2B shows control circuitry according to an embodiment of the present invention for executing a read operation using seed values stored in an array.

FIG. 2B illustrates a read operation according to an embodiment of the present invention which is understood with reference to the flow diagram of FIG. 1B. A read command is received from a host comprising a plurality of LBAs (step 8). The LBAs are mapped to PBAs representing memory segments in the non-volatile memory (step 10). At least two seed values are generated corresponding to two of the LBAs and stored in an array 50 (step 12). The array 50 is indexed to recover one of the seed values 56 (step 14), and the seed value is loaded into an EC syndrome generator 58 (step 16). The user data (and optionally the seed value 34) and first error code redundancy 40 are read from the memory segment (step 18). An ECC syndrome generator 60 generates an ECC syndrome 62 over the read data, wherein the ECC syndrome 62 is processed to determine whether the memory segment is correctable (step 64). If the memory segment is correctable, an error corrector 66 processes the ECC syndrome 62 to correct errors in the data read from the memory segment (step 66). After correcting the errors, the EC syndrome generator 58 generates a second error code 68 over the user data (step 20). If the second error code 68 indicates an error (step 70), it means a miss-correction occurred, or it means the LBA received with the read command does not match the LBA used to write the memory segment. In one embodiment, an error is detected (step 70) when the second error code 68 generated during the read operation does not match the first error code 40 generated during the write operation. If no error is detected (step 70), the user data read from the memory segment is returned to the host (conceptually illustrated with an AND gate 72 in FIG. 2B). An index into the array 50 is incremented (step 24) to recover the next seed value for the next LBA (step 14) and the process is repeated until all of the LBAs in the read command have been processed (step 22).

Figure 4:
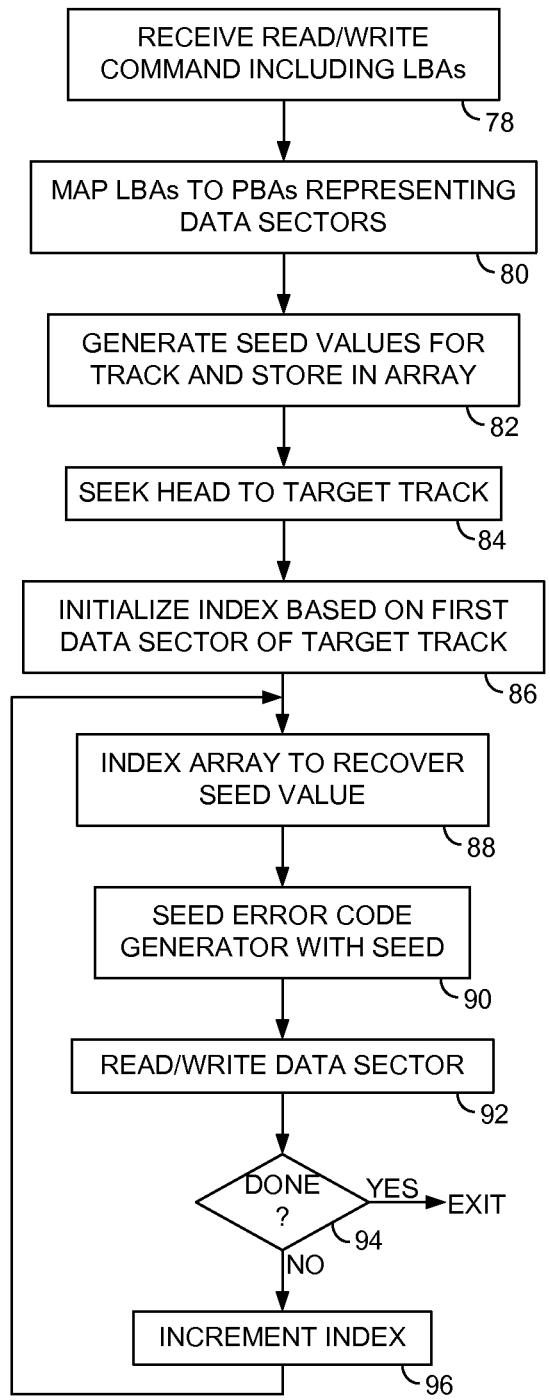
FIG. 4 is a flow diagram according to an embodiment of the present invention wherein seed values for an entire track of data sectors are stored in an array, and the seed value corresponding to a first data sector after a seek is read from the array.
Figure 6:
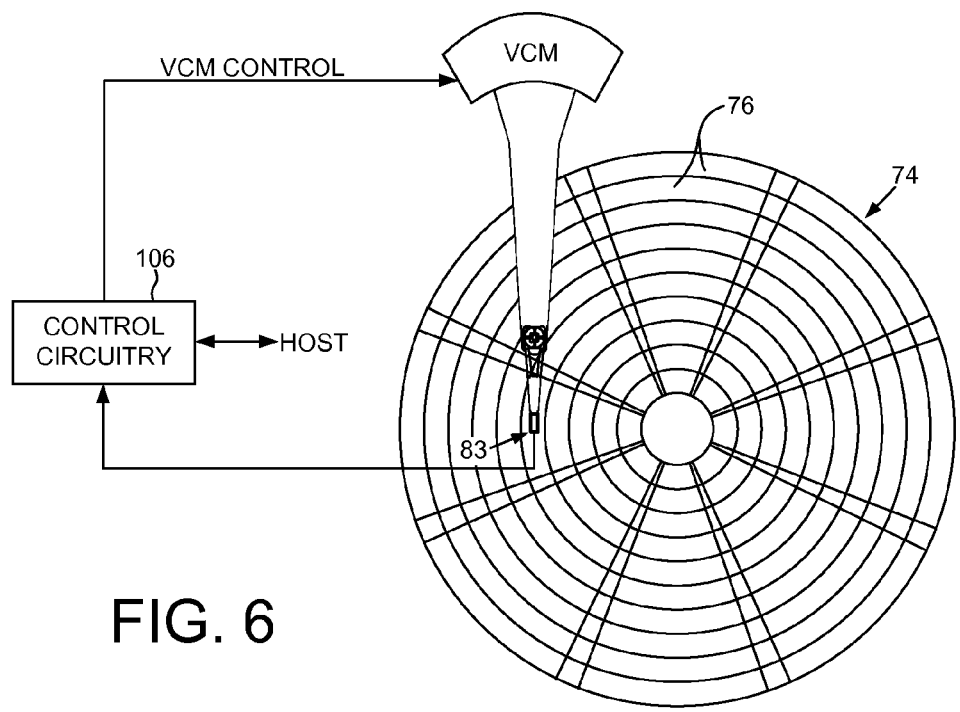
FIG. 6 shows an embodiment of the present invention wherein the data storage device comprises a disk drive.

FIG. 4 is a flow diagram executed by the control circuitry 6 according to an embodiment of the present invention when the non-volatile memory 4 comprises a disk 74 of a disk drive (FIG. 6). The disk 74 comprises a plurality of concentric data tracks 76, wherein each data track comprises a plurality of memory segments referred to as data sectors. When a read/write command is received from a host comprising a plurality of LBAs (step 78), the LBAs are mapped to PBAs addressing data sectors (step 80). When a data sector of a particular data track is to be read/written, the seed values for all of the data sectors in the track are generated and stored in the array (step 82). The control circuitry seeks a head 83 to the target track (step 84), and when the head 83 reaches the target track, the index into the array is initialized based on an initial circumferential location of the head 83 (step 86). A corresponding seed value is recovered from the array (step 88) and loaded into the error code generator (step 90). The read/write operation is performed (step 92) including to generate the error codes for data path protection. The index is then incremented for the next data sector of the track (step 96) and the process is repeated for a number of data sectors (step 94).

In one embodiment, when executing a write operation the head 83 may reach the target track several data sectors before the target data sector(s). In this embodiment, the error code generator may be loaded with the seed values of the data sectors preceding the target data sector(s), but the preceding data sectors are not actually written. At the end of each data sector the index is incremented and the write operation performed when the head 83 reaches the target data sector(s).

In one embodiment, when executing a read operation the head 83 may reach the target track several data sectors before the target data sector(s). In this embodiment, the preceding data sectors may still be read to implement a predictive caching algorithm. Similarly, data sectors following the target data sector(s) may be read to implement a predictive caching algorithm.

Generating all of the seed values for a target track before and/or during the seek operation ensures that the error codes for each data sector can be generated on-the-fly as each data sector is read/written. In addition, the index can be correctly initialized to the correct starting seed value regardless as to where the head 83 lands on the target track.

Figure 5:
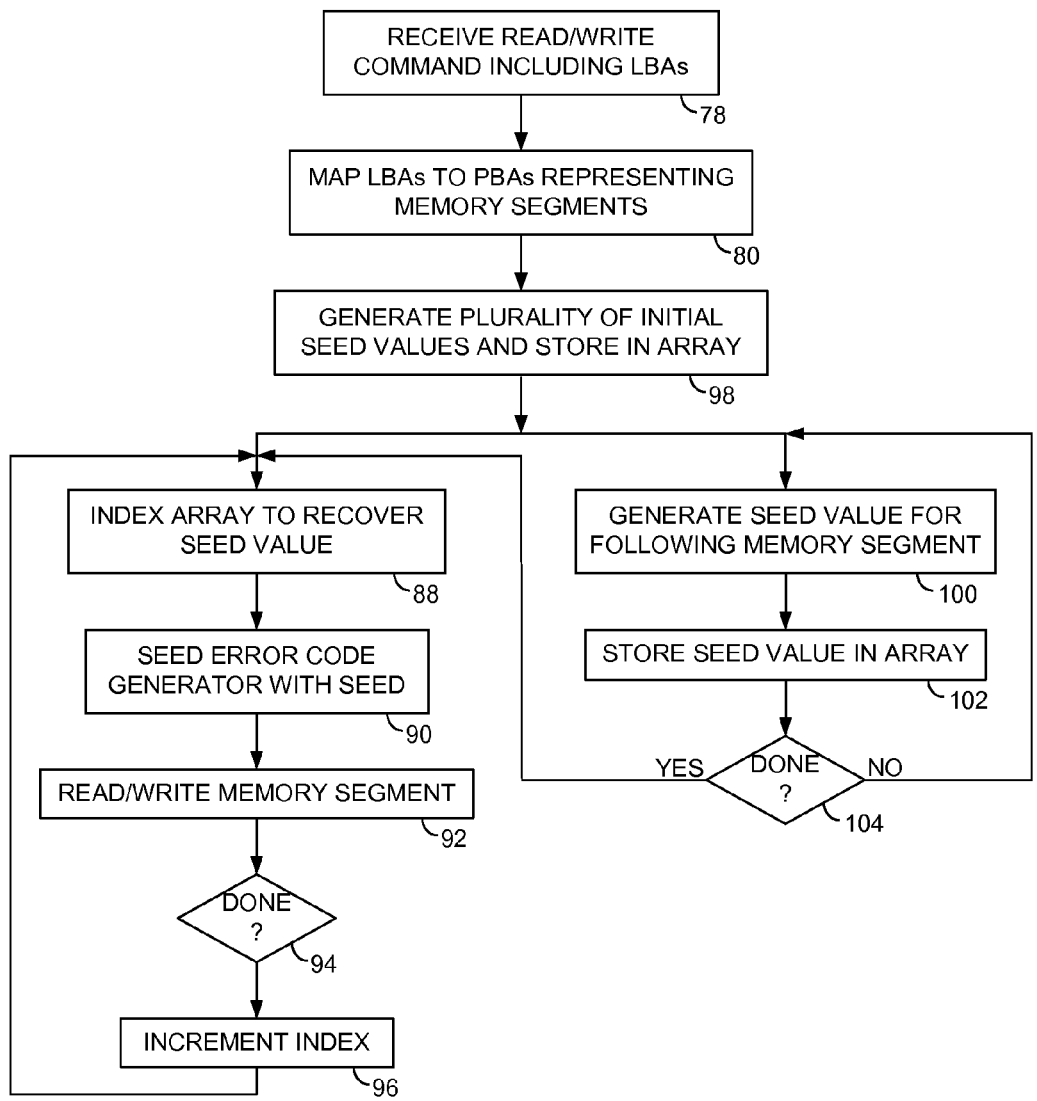
FIG. 5 is a flow diagram according to an embodiment of the present invention wherein seed values are generated for future memory segments while reading/writing a current memory segment.

FIG. 5 is a flow diagram according to an embodiment of the present invention wherein a plurality of initial seed values are generated and stored in the array (step 98). Then while performing a read/write operation on a first memory segment (steps 88-96), a seed value for a following memory segment is generated (step 100) and stored in the array (step 102). That is, the remaining seed values for the LBAs in the access command are generated concurrently with performing read/write operations for the initial LBAs. This process continues until all of the seed values have been generated and stored in the array (step 104). In one embodiment, a sufficient number of initial seed values are generated (step 98) to ensure there is enough time to generate the remaining seed values (e.g., before slipping a revolution in a disk drive).

Figure 7:
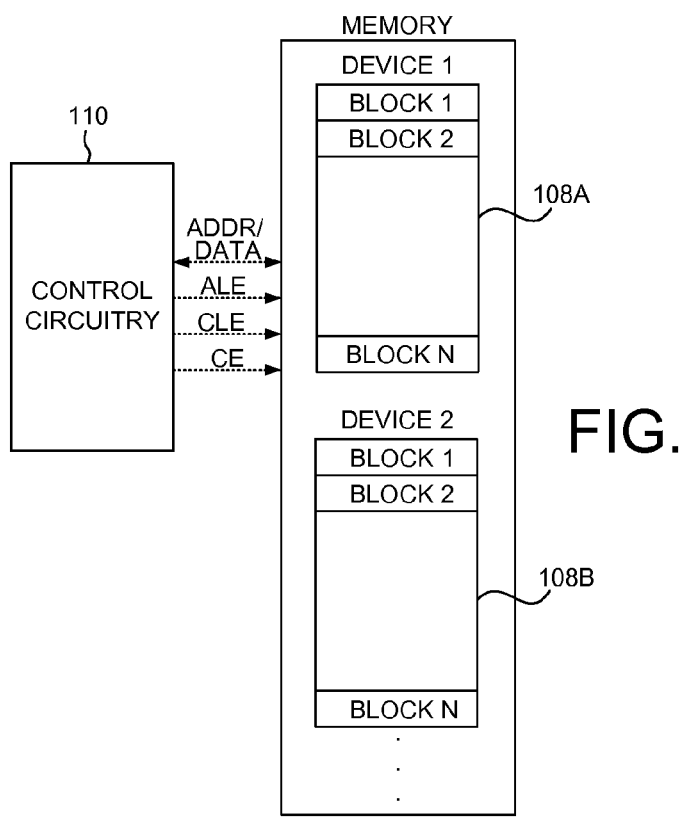
FIG. 7 shows an embodiment of the present invention wherein the data storage device comprises a solid state drive.

The embodiments of the present invention may be employed in any suitable data storage system. FIG. 6 shows a data storage system comprising a disk drive including a head 83 actuated over a disk 74 and control circuitry 106 for executing at least part of the flow diagrams described herein. FIG. 7 shows a solid state drive comprising a plurality of non-volatile semiconductor memories 108A, 108B, etc., such as flash memories, and control circuitry 110 for executing at least part of the flow diagrams described herein. A hybrid data storage system may also be employed comprising components of a disk drive shown in FIG. 6 combined with the non-volatile semiconductor memories shown in FIG. 7.

The control circuitry in the data storage device may comprise any suitable circuitry for implementing the flow diagrams herein, such as one or more integrated circuits. In one embodiment, the control circuitry 4 may comprise one or more microprocessors for executing code segments of a control program. In other embodiments, the control circuitry 4 may comprise state machine circuitry in an application specific integrated circuit (ASIC).

What is claimed is:
1. A data storage device comprising:
a non-volatile memory comprising a plurality of memory segments; and
control circuitry operable to:
receive a read command identifying a plurality of logical block addresses (LBAs);
map the LBAs to physical block addresses (PBAs) addressing the memory segments;

generate at least two seed values corresponding to two of the LBAs;
store the seed values in an array;
after storing the seed values in the array:
  index the array with an index value to access a first one of the seed values corresponding to a first LBA;
  seed an error code generator with the first seed value;
  read data from a first memory segment corresponding to the first LBA;
  generate a first error code using the error code generator;
  increment the index value;
  index the array with the incremented index value to access a second one of the seed values corresponding to a second LBA;
  seed the error code generator with the second seed value;
  read data from a second memory segment corresponding to the second LBA; and
  generate a second error code using the error code generator.

2. The data storage device as recited in claim 1, wherein the first error code comprises a cyclic redundancy check (CRC) error code.

3. The data storage device as recited in claim 1, wherein:
  a first LBA mapped to a first PBA is non-sequential with a second LBA mapped to a second PBA; and
  the first PBA is sequential with the second PBA.

4. The data storage device as recited in claim 1, wherein the data storage device further comprises a head actuated over a disk comprising a plurality of tracks, each track comprising a plurality of the memory segments, the control circuitry is further operable to:
  generate a plurality of seed values corresponding to the memory segments of a target track;
  seek the head to the target track; and
  after the head reaches the target track, index the array to recover a seed value corresponding to an initial circumferential location of the head.

5. The data storage device as recited in claim 1, wherein the control circuitry is further operable to:
  generate a third seed value corresponding to a third LBA while reading data from the first memory segment; and
  store the third seed value in the array.

6. The data storage device as recited in claim 1, wherein the non-volatile memory comprises a disk.

7. The data storage device as recited in claim 1, wherein the non-volatile memory comprises a semiconductor memory.

8. A data storage device comprising:
  a non-volatile memory comprising a plurality of memory segments; and
  control circuitry operable to:
    receive a write command identifying a plurality of logical block addresses (LBAs);
    map the LBAs to physical block addresses (PBAs) addressing the memory segments;
    generate at least two seed values corresponding to two of the LBAs;
    store the seed values in an array;
    after storing the seed values in the array:
      index the array with an index value to access a first one of the seed values corresponding to a first LBA;
      seed an error code generator with the first seed value;
      generate a first error code using the error code generator;
      write data and the first error code to a first memory segment corresponding to the first LBA;
      increment the index value;
      index the array with the incremented index value to access a second one of the seed values corresponding to a second LBA;
      seed the error code generator with the second seed value;
      generate a second error code using the error code generator; and
      write data and the second error code to a second memory segment corresponding to the second LBA.

9. The data storage device as recited in claim 8, wherein the first error code comprises a cyclic redundancy check (CRC) error code.

10. The data storage device as recited in claim 8, wherein:
  a first LBA mapped to a first PBA is non-sequential with a second LBA mapped to a second PBA; and
  the first PBA is sequential with the second PBA.

11. The data storage device as recited in claim 8, wherein the data storage device further comprises a head actuated over a disk comprising a plurality of tracks, each track comprising a plurality of the memory segments, the control circuitry is further operable to:
  generate a plurality of seed values corresponding to the memory segments of a target track;
  seek the head to the target track; and
  after the head reaches the target track, index the array to recover a seed value corresponding to an initial circumferential location of the head.

12. The data storage device as recited in claim 8, wherein the control circuitry is further operable to:
  generate a third seed value corresponding to a third LBA while writing data to the first memory segment; and
  store the third seed value in the array.

13. The data storage device as recited in claim 8, wherein the non-volatile memory comprises a disk.

14. The data storage device as recited in claim 8, wherein the non-volatile memory comprises a semiconductor memory.

15. A method of operating a data storage device, the data storage device comprising a non-volatile memory comprising a plurality of memory segments, the method comprising:
  receiving a read command identifying a plurality of logical block addresses (LBAs);
  mapping the LBAs to physical block addresses (PBAs) addressing the memory segments;
  generating at least two seed values corresponding to two of the LBAs;
  storing the seed values in an array;
  after storing the seed values in the array:
    indexing the array with an index value to access a first one of the seed values corresponding to a first LBA;
    seeding an error code generator with the first seed value;
    reading data from a first memory segment corresponding to the first LBA;
    generating a first error code using the error code generator;
    incrementing the index value;
    indexing the array with the incremented index value to access a second one of the seed values corresponding to a second LBA;
    seeding the error code generator with the second seed value;
    reading data from a second memory segment corresponding to the second LBA; and
    generating a second error code using the error code generator.

16. The method as recited in claim 15, wherein the first error code comprises a cyclic redundancy check (CRC) error code.

17. The method as recited in claim 15, wherein:
a first LBA mapped to a first PBA is non-sequential with a second LBA mapped to a second PBA; and
the first PBA is sequential with the second PBA.

18. The method as recited in claim 15, wherein the data storage device further comprises a head actuated over a disk comprising a plurality of tracks, each track comprising a plurality of the memory segments, the method further comprising:
generating a plurality of seed values corresponding to the memory segments of a target track;
seeking the head to the target track; and
after the head reaches the target track, indexing the array to recover a seed value corresponding to an initial circumferential location of the head.

19. The method as recited in claim 15, further comprising:
generating a third seed value corresponding to a third LBA while reading data from the first memory segment; and
storing the third seed value in the array.

20. The method as recited in claim 15, wherein the non-volatile memory comprises a disk.

21. The method as recited in claim 15, wherein the non-volatile memory comprises a semiconductor memory.

22. A method of operating a data storage device comprising a non-volatile memory comprising a plurality of memory segments, the method comprising:
receiving a write command identifying a plurality of logical block addresses (LBAs);
mapping the LBAs to physical block addresses (PBAs) addressing the memory segments;
generating at least two seed values corresponding to two of the LBAs;
storing the seed values in an array;
after storing the seed values in the array:
indexing the array with an index value to access a first one of the seed values corresponding to a first LBA;
seeding an error code generator with the first seed value;
generating a first error code using the error code generator;
writing data and the first error code to a first memory segment corresponding to the first LBA;
incrementing the index value;
indexing the array with the incremented index value to access a second one of the seed values corresponding to a second LBA;
seeding the error code generator with the second seed value;
generating a second error code using the error code generator; and
writing data and the second error code to a second memory segment corresponding to the second LBA.

23. The method as recited in claim 22, wherein the first error code comprises a cyclic redundancy check (CRC) error code.

24. The method as recited in claim 22, wherein:
a first LBA mapped to a first PBA is non-sequential with a second LBA mapped to a second PBA; and
the first PBA is sequential with the second PBA.

25. The method as recited in claim 22, wherein the data storage device further comprises a head actuated over a disk comprising a plurality of tracks, each track comprising a plurality of the memory segments, the method further comprising:
generating a plurality of seed values corresponding to the memory segments of a target track;
seeking the head to the target track; and
after the head reaches the target track, indexing the array to recover a seed value corresponding to an initial circumferential location of the head.

26. The method as recited in claim 22, further comprising:
generating a third seed value corresponding to a third LBA while writing data to the first memory segment; and
storing the third seed value in the array.

27. The method as recited in claim 22, wherein the non-volatile memory comprises a disk.

28. The method as recited in claim 22, wherein the non-volatile memory comprises a semiconductor memory.

* * * * *